United States Patent [19]
Grammel, Jr.

[11] Patent Number: 5,219,190
[45] Date of Patent: Jun. 15, 1993

[54] SHEAR WIRE FLANGE JOINT FOR A GAS TURBINE ENGINE

[75] Inventors: Leonard P. Grammel, Jr., Cincinnati; Robert H. Kraimer, West Chester, both of Ohio

[73] Assignee: General Electric Company, Cincinnati, Ohio

[21] Appl. No.: 699,058

[22] Filed: May 13, 1991

[51] Int. Cl.⁵ ............................................. F16L 37/14
[52] U.S. Cl. ................................... 285/305; 285/276
[58] Field of Search ...................... 285/305, 276, 362

[56] References Cited

U.S. PATENT DOCUMENTS

| | | | |
|---|---|---|---|
| 2,890,073 | 6/1959 | Thomas | 285/305 X |
| 2,914,919 | 12/1959 | Varadi | 60/39.31 |
| 3,092,962 | 6/1963 | Wood | 285/305 |
| 3,228,186 | 1/1966 | Allen | 60/35.6 |
| 3,243,124 | 3/1966 | Lee | 239/127.1 |
| 3,243,126 | 3/1966 | Kurti et al. | 239/265.39 |
| 3,304,865 | 2/1967 | Gungle | 102/49 |
| 3,339,832 | 9/1967 | Duecker | 285/305 X |
| 3,404,904 | 10/1968 | Roe | 285/305 X |
| 3,568,929 | 3/1971 | Butter et al. | 239/127.1 |
| 3,692,334 | 9/1972 | Doyle et al. | 285/305 X |
| 3,694,883 | 10/1972 | Olcott | 29/157 C |
| 3,742,704 | 7/1973 | Adelizzi et al. | 60/39.31 |
| 3,753,582 | 8/1973 | Graham | 285/305 |
| 3,814,539 | 6/1974 | Klompas | 416/95 |
| 3,929,289 | 12/1975 | Kardon et al. | 239/265.11 |
| 4,011,718 | 3/1977 | Asplund | 60/39.31 |
| 4,114,368 | 9/1978 | Davis et al. | 60/39.16 R |
| 4,427,221 | 1/1984 | Shay, Jr. | 285/305 |
| 4,635,974 | 1/1987 | Moussaian | 285/305 |
| 4,643,636 | 2/1987 | Libertini et al. | 415/138 |
| 4,817,970 | 4/1989 | Krauss | 277/25 |
| 4,883,405 | 11/1989 | Walker | 415/137 |

FOREIGN PATENT DOCUMENTS

| | | |
|---|---|---|
| 0080404 | 11/1982 | European Pat. Off. . |
| 966298 | 7/1957 | Fed. Rep. of Germany . |
| 476219 | 9/1969 | Switzerland . |
| 167035 | 8/1921 | United Kingdom . |
| 8801357 | 2/1988 | World Int. Prop. O. . |

Primary Examiner—Eric K. Nicholson
Attorney, Agent, or Firm—Jerome C. Squillaro; David L. Narciso

[57] ABSTRACT

In an axial flow gas turbine engine, a shear wire flange joint for an aft centerbody having an outer ring flange, and an inner ring flange that are held close together and a locking member interposed therebetween is provided. The flanges are specially configured to achieve positional alignment and a uniformly shaped groove is machined into the surface of both the inner and the outer ring flange. The circumferential grooves are aligned to form a space between the flanges. A wire is inserted into the space through a window provided in the outer ring flange. The wire locks the inner and the outer ring flange together by preventing axial movement of the inner and outer ring flanges relative to one another.

11 Claims, 2 Drawing Sheets

SHEAR WIRE FLANGE JOINT FOR A GAS TURBINE ENGINE

The Government has rights in this invention pursuant to Contract No. F33657-83-C-0281 awarded by the Department of the Air Force.

BACKGROUND OF THE INVENTION

1. Field of the Invention

This invention relates, in general, to gas turbine engines, and more particularly to a shear wire flange joint for mounting an aft centerbody to a gas turbine engine frame.

2. Description of the Prior Art

Most gas turbine engines use an aft centerbody to diffuse hot exhaust gas that exits the rear of the engine. The present method of attaching the aft centerbody to the main structure of the engine incorporates conventional nut and bolt configurations. The temperature of the exhaust gas can be in the range between 1300° F. and 4000° F., which causes temperature cycling problems with all nut and bolt configurations. As the engine goes through several temperature cycles, bolts tend to gall and seize. During disassembly, bolts must often be drilled out in order to be removed, which is expensive and causes increased time for maintenance and repair. Use of bolt and nut configurations also requires machining of 90 degree flanges to provide a working surface for the nut and bolt, which adds weight and increases assembly time. In some nut and bolt configurations, bolt heads are in the exhaust gas flowpath which can disrupt the aerodynamics of the engine and accelerate the deterioration of the bolt.

The present invention eliminates the need for nut and bolt configurations, reduces engine weight, is faster to assemble and repair, minimizes any aerodynamic disturbances in the exhaust gas flowpath, and is less expensive than the present method of assembly.

Accordingly, it is an object of this invention to provide a gas turbine engine having a boltless centerbody joint which is attached without connection bolts.

It is a further object of this invention to provide a gas turbine engine having a centerbody joint that is reduced in weight.

It is a further object of this invention to provide a gas turbine engine having a centerbody joint that is easy to assemble and disassemble.

It is a further object of this invention to provide a gas turbine engine having a substantially disturbance free gas flowpath at the connection site of the aft centerbody.

SUMMARY OF THE INVENTION

In carrying out a preferred form of this invention in an axial flow gas turbine engine, a shear wire flange joint means is provided that includes an outer ring flange, an inner ring flange, and a locking member interposed therebetween. A ring flange, as used herein, is a generally circular band that has a controlled surface parallel to its axis that is designed to engage a second similar mating surface for the purpose of joining two structures. Ring flanges usually are used in pairs, one called an inner ring flange that is made with an outside surface being machined to a first required radial tolerance and fitting inside of an outer ring flange that is made with an inside surface being machined to a second required radial tolerance. A uniformly shaped groove is machined into the surface of the outer ring flange around its circumference. The groove may also be machined in segments, though a continuous groove is preferred. A similar groove is also machined into the surface of the inner ring flange around its circumference and is located to be axially and circumferentially aligned with the groove in the outer ring flange, thereby forming at least one uniformly shaped space between the inner and the outer ring flange.

Notches or windows are cut out at various circumferential locations in the outer ring flange to permit insertion of a wire into the space or spaces. The window depth is less than the axial width of the outer ring flange. The inner ring flange can be an integral part of an aft centerbody for an axial flow gas turbine engine. The outer ring flange is attached to and made a part of the frame structure of the axial flow gas turbine engine. At assembly, the aft centerbody is mated with the frame structure by axial and radial juxtaposition of the inner and outer ring flanges. Axial alignment of the grooves is ensured by a circumferential stop formed on the inner ring flange. Circumferential alignment is ensured by a spline or key that prevents assembly unless aligned correctly. A first end of a wire is inserted into the space via the windows in the outer ring flange. A 90 degree bend is included in a second end of the wire and prevents over insertion of the wire and provides means for grasping the wire for removal. A wire is inserted at each window location which virtually fills the space and locks the inner ring flange and outer ring flange together. The first end o f the wire may extend into an adjacent window where it may be bent after installation, but is not required to produce the locking function of the wire. Any motion of either ring flange, that tends to separate the aft centerbody from the frame structure, causes a shear force to be transmitted from the inner ring flange to the outer ring flange through the wire by contact with each flange at the groove site. Disassembly is accomplished by removal of the wire from the space and axially separating the ring flanges.

In a preferred embodiment, an axial flow gas turbine engine has an aft centerbody that is comprised of two sections. The first section has a forward end and an aft end. The forward end is attached to a turbine frame which is part of the engine's fixed frame. The aft end incorporates the outer ring flange and three windows spaced 120 degrees apart. The second section comprises the closed end of the aft centerbody and includes the inner ring flange. Both the outer and the inner ring flange have semi-circular grooves machined around their entire circumference. Attachment of the second section to the first section is implemented by axially inserting the second section into the first section such that the inner ring flange engages the outer ring flange and the stop on the inner ring flange ensures that the grooves in the flanges are adjacent to one another and form a uniform circular space between the flanges. Assembly is complete when a circular wire has been inserted into each space through the three windows located around the circumference of the shear wire flange joint.

Although three windows were used in this preferred embodiment, it would be obvious to one skilled in the art that the number of windows, above one, would be determined by the specific application and that any number of windows would be contemplated by this invention.

In an alternate embodiment of this invention, semi-circular grooves in the inner and the outer ring flanges are circumferentially segmented. A key is incorporated in the inner and the outer ring flange to ensure circumferential alignment of the groove segments. Each segment has at least one window for insertion of a circular wire, as described in the preferred embodiment. This type of configuration may be preferred when the shear wire ring flange joint is used on a rotating structure. The key will prevent rotation between the inner and the outer ring flanges.

In another alternate embodiment of this invention, the cross-sectional shape of the space and the wire is rectangular, or possibly, square. All other features and variations of the preferred embodiment are the same. The rectangular shape provides an additional advantage because it will tolerate a greater variation in the clearance between the inner ring flange and the outer ring flange than will the circular cross-section. This is particularly important when connecting structures made of different materials that have different coefficients of thermal expansion.

The outer ring flange may expand more than the inner ring flange, which could permit the wire to fall out of the space or become ineffective as a locking member.

A shear wire flange joint, as described herein, provides several improvements in a gas turbine engine. Frequently located inside the aft centerbody is an aft bearing lube oil sump. The sump periodically requires maintenance which necessitates removal of the aft centerbody to provide access. When engines incorporate the shear wire flange joint on its aft centerbody, access to the sump is accomplished quickly by removal of the shear wires and removal of the second section of the aft centerbody. Nut and bolt configurations require more time to remove because a galled bolt often times must be drilled out for removal. Nut and bolt configurations are heavier and cause aerodynamic disturbances in the flowpath of the gas turbine engine that are not present with a shear wire flange joint.

Other embodiments of this invention would be apparent to one skilled in the art, including but not limited to use on other structures of a gas turbine engine, for example, other centerbody configurations, both rotating and non-rotating. Other centerbody configurations may be in a cooler part of the gas turbine engine where nut and bolt configurations could function without failure. However, a shear wire flange joint would be easier to assemble and repair, would weigh less, and would provide a smoother aerodynamic profile. It would also be apparent to one skilled in the art that the shear wire flange joint would be useful to join non-circular structures, for example, oval or rectangle shaped interfaces.

In all applications of the shear wire flange joint, it is important to control the clearance between inner ring flange and the outer ring flange. Expansion and contraction of the ring flanges over the operating temperature range of the shear wire flange joint require that the materials used have compatible coefficients of thermal expansion. For example, if the coefficient of thermal expansion of the wire is too low or if the outer ring flange has too high a coefficient of thermal expansion compared to that of the inner ring flange, the clearance between ring flanges may open enough to cause the wire to fall out of the space created by the aligned grooves. Varying the shape of the space and the wire may also be selected to provide other useful functions without deviating from the scope and intent of this invention, for example, like sealing the flange joint.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE PREFERRED EMBODIMENT

Figure 1:
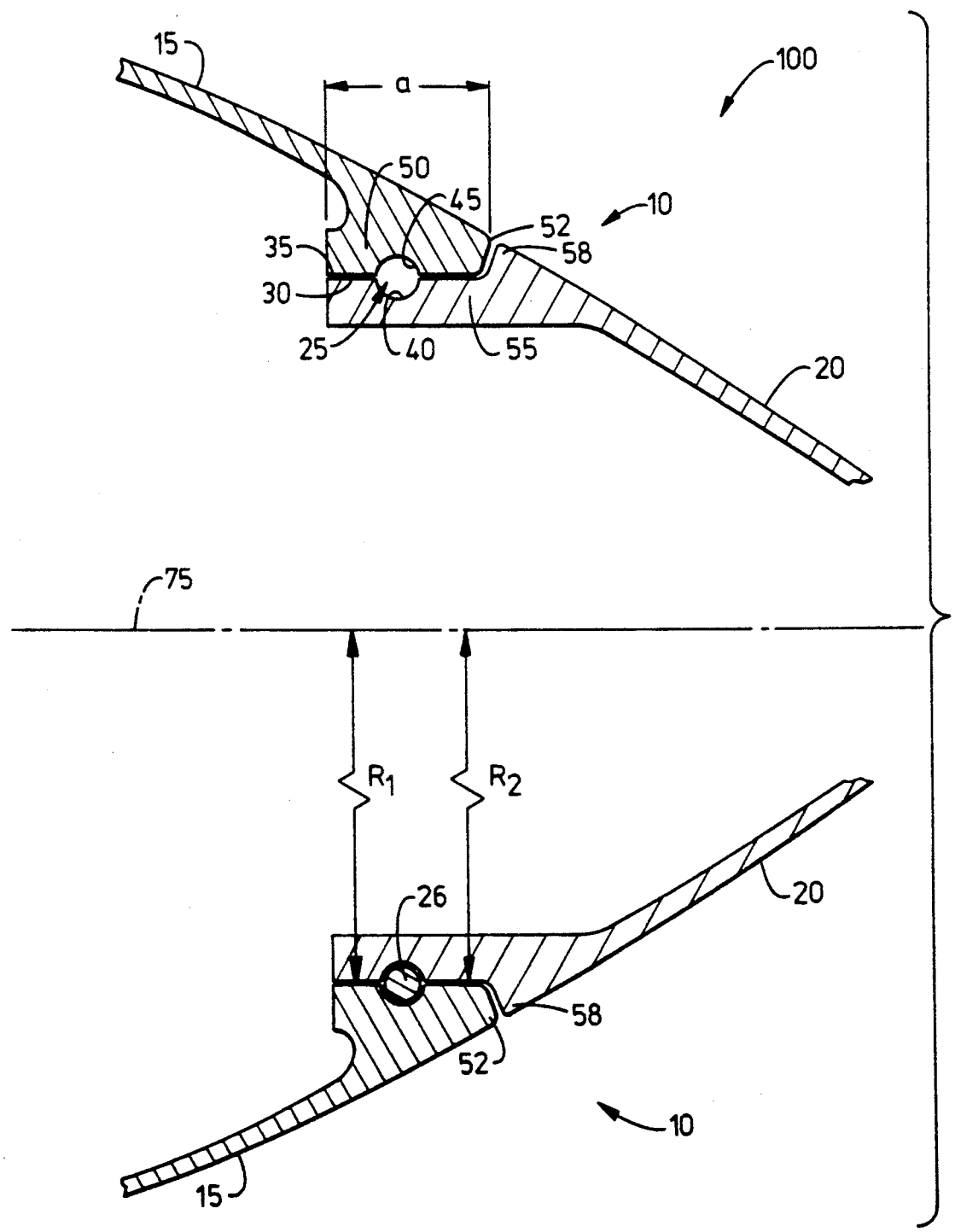
FIG. 1 is a cross-section of an aft centerbody showing a shear wire ring flange assembly.

Referring now to the Figures wherein like reference numerals have been used throughout to designate like parts. FIG. 1 shows a cross-section of an aft centerbody of an axial flow gas turbine engine (not shown). In an axial flow gas turbine engine, the aft centerbody 100 is symmetric about engine axis 75. Aft centerbody 100 is separated into two sections, forward section 15 and the aft section 20. Shear wire flange joint 10 connects the forward and aft sections 15 and 20 respectively. Outer ring flange 50 is formed along aft end 52 of forward section 15. Surface 30 on outer ring flange 50 is parallel to engine axis 75 and is a uniform radius R1 from engine axis 75. Semi-circular groove 45 is formed in surface 30 around the entire circumference of outer ring flange 50. Inner ring flange 55 is formed on aft section 20 of centerbody 100 and has a uniform radius R2 from engine axis 75, where $$0.003 \text{ inches} \leq (R_1 - R_2) \leq 0.009 \text{ inches}.$$

Surface 35 of inner ring flange 55 faces surface 30 and is also parallel to engine axis 75. Semi-circular groove 40 is formed in surface 35 around the entire circumference of inner ring flange 55 which is shaped to include stop 58 extending radially outward from surface 35 and stop 58 is configured to assemble centerbody 100; wherein when aft section 20 is inserted along engine axis 75 until circumferential stop 58 abuts end 52, forward section 15 and aft section 20 form an aerodynamically continuous surface and semi-circular groove 45 in outer ring flange 50 is axially and radially aligned with semi-circular groove 40 in inner ring flange 55 which forms circular space 25 between the inner ring flange 55 and outer ring flange 50. To complete joint 10, wire 26 is inserted in space 25. The presence of wire 26 in space 25 prevents inner ring flange 55 from moving axially relative to outer ring flange 50. Any relative motion between flanges is prevented by a shear force developed through wire 26 in space 25.

Figure 2:
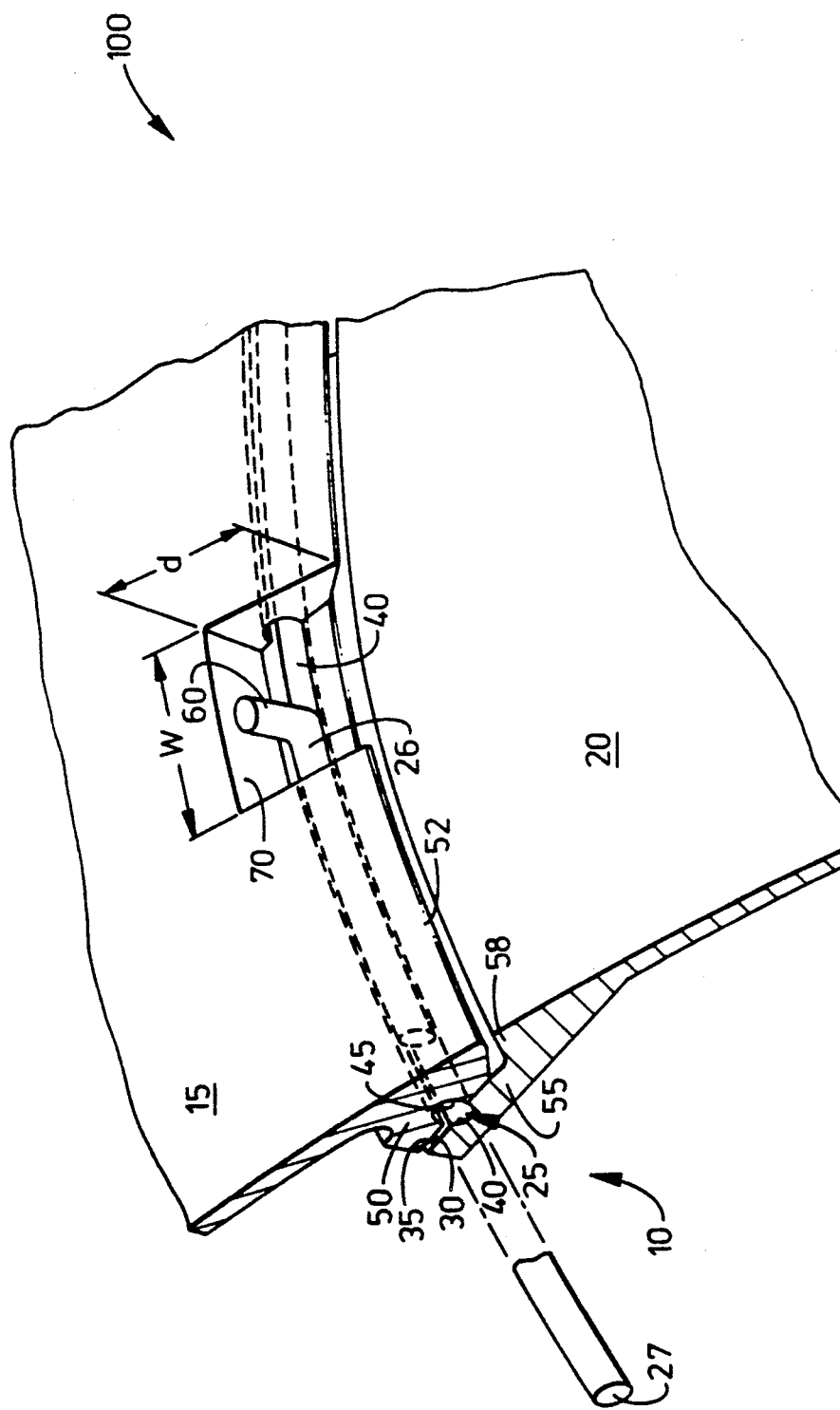
FIG. 2 illustrates a perspective view of a window in a shear wire flange joint.

FIG. 2 shows window 70 as formed in outer ring flange 50 and wire 26 as inserted into circular space 25. Window 70 has a width, W, and a depth, d, where depth, d, is less than axial length, a, of outer ring flange 50. Forward section 15 and aft section 20 of rear centerbody 100 are shown cut away. First end 27 of wire 26 is inserted into space 25 at window 70 and second end 60 has a 90 degree bend which prevents over insertion into space 25. There is at least one window 70 formed around the circumference of the shear wire ring flange joint 10. In normal operation, it is preferred that there be three windows 70 and three wires 26 each wire 26 having a 90 degree bend 60. Wires 26 are inserted in space 25; and, upon final assembly, there is a virtual filling of space 25 with wire 26. Stop 58 is formed around the circumference of inner ring flange 55. Stop 58 facilitates installation of aft section 20 of rear centerbody 100 by providing a means for assuring alignment of semi-circular groove 45 on outer ring flange 50 and semi-circular groove 40 on inner ring flange 55.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

It is claimed:

1. A gas turbine engine shear wire flange assembly for use in an axial flow gas turbine engine including a turbine frame, comprising:
   an aft centerbody having a forward section and an aft section along a common axis;
   said forward section and said aft section having a substantially continuous external aerodynamic surface;
   said forward section including a forward end attached to the turbine frame and an aft end;
   an outer ring flange formed along said aft end of said forward section of said aft centerbody and including a circumferential groove facing radially inward;
   said aft section including a forward end and a closed, aft end;
   an inner ring flange formed in said forward end of said aft section adapted to matingly engage said outer ring flange, having a circumferential groove facing radially outward for being axially and circumferentially aligned with said groove in said outer ring flange, and having a similar cross-sectional size and shape, forming a substantially uniformly sized and shaped cross-sectional space therebetween when aligned;
   a removable wire having a first end, a second end, and a cross-sectional size and shape substantially matching the cross-sectional size and shape of said space; and
   means for removeably installing said wire into said space so as to lock the inner flange to said outer flange.

2. A gas turbine engine shear wire flange assembly as described in claim 1 further comprising at least one window in said outer ring flange adapted to receive said wire.

3. A gas turbine engine shear wire flange assembly as described in claim 2 wherein said wire has a 90 degree bend along said second end to prevent over insertion of the wire through said window and to provide means for grasping the wire for removal.

4. A gas turbine engine shear wire flange assembly as described in claim 3 including a plurality of windows.

5. A gas turbine engine shear wire flange assembly as described in claim 4 wherein said wire has a 90 degree bend along said first end within a different window from said window including said second end.

6. A gas turbine engine shear wire flange assembly as described in claim 4 wherein each window is adapted to receive a wire.

7. A gas turbine engine shear wire flange assembly as described in claim 4 wherein said plurality of windows are uniformly spaced.

8. A gas turbine engine shear wire flange assembly as described in claim 1 wherein said uniformly sized and shaped cross-sectional space is circular.

9. A gas turbine engine shear wire flange assembly as described in claim 8 wherein said wire has a uniformly sized and shaped cross-sectional area that is circular.

10. A gas turbine engine shear wire flange assembly as described in claim 1 wherein said inner ring flange has an axial stop.

11. A gas turbine engine shear wire flange assembly as described in claim 1 wherein said inner ring flange and said outer ring flange are generally circular in shape.

* * * * *